United States Patent [19]
Abramczyk et al.

[11] Patent Number: 5,364,123
[45] Date of Patent: Nov. 15, 1994

[54] AIR BAG MODULE

[75] Inventors: William M. Abramczyk, Rochester Hills, Mich.; Kimberly L. Ikirt, Springboro, Ohio

[73] Assignee: General Motors Corporation, Detroit, Mich.

[21] Appl. No.: 188,862

[22] Filed: Jan. 31, 1994

[51] Int. Cl.$^5$ ............................................. B60R 21/16
[52] U.S. Cl. ........................... 280/728 A; 280/728 R; 280/743 R
[58] Field of Search ............ 280/728 R, 728 A, 743 R, 280/732

[56] References Cited

U.S. PATENT DOCUMENTS

| | | | |
|---|---|---|---|
| 3,807,754 | 4/1974 | Rodenbach et al. | 280/743 R |
| 3,937,488 | 2/1976 | Wilson et al. | 280/743 R X |
| 4,153,273 | 5/1979 | Risko | 280/732 X |
| 4,915,410 | 4/1990 | Bachelder | 280/732 |
| 4,941,678 | 7/1990 | Lauritzen et al. | 280/732 |
| 4,989,897 | 2/1991 | Takada | 280/743 |
| 5,022,675 | 6/1991 | Zelenak, Jr. et al. | 280/742 R |
| 5,062,664 | 11/1991 | Bishop et al. | 280/743 |
| 5,074,584 | 12/1991 | Jarboe | 280/728 A |
| 5,094,475 | 3/1992 | Olsson et al. | 280/741 |
| 5,149,130 | 9/1992 | Wooley et al. | 280/743 |
| 5,255,937 | 10/1993 | Bakhsh et al. | 280/732 X |

FOREIGN PATENT DOCUMENTS 2237538  5/1991  United Kingdom ........... 280/728 A

OTHER PUBLICATIONS

James K. Conlee et al, "Fabric Housing for Air Bag Inflator", U.S. Ser. No. 08/070515 filed 02-Jun-1993 and commonly assigned.

*Primary Examiner*—Mitchell J. Hill
*Assistant Examiner*—Christopher P. Ellis
*Attorney, Agent, or Firm*—Jeffrey A. Sedlar

[57] ABSTRACT

A air bag module for use in an automobile supplemental passenger restraint system. The air bag module includes a housing serving as a reaction device that contains an inflator, an air bag retainer engaging the inflator, and a folded air bag cushion connected to the air bag retainer. The housing is closed by a cover that serves as a deployment door for the air bag cushion.

10 Claims, 4 Drawing Sheets

000
AIR BAG MODULE

BACKGROUND OF THE INVENTION

This invention relates to a supplemental occupant restraint system for an automobile of the air bag type. More particularly, the invention is directed to an air bag module including a retainer for holding the air bag cushion in position relative to the module, wherein the retainer is secured to the module by engaging an inflator.

Air bags are well known supplemental restraint systems in widespread use for the safety of automobile occupants. Air bags systems have been developed that typically comprise three basic subsystem groups. These groups include impact sensors and associated wiring, diagnostic devices and air bag modules. The third group, the air bag module, is the subject of the present invention.

The air bag module has been developed for assembly in a modular form and is primarily a complete packaged unit for installation in the automobile interior and connection to the other subsystems during assembly of the vehicle. The air bag module typically comprises a container that serves as both a housing and a reaction device, an inflator that includes a gas generation mechanism, and a cushion that is folded, inserted into the container and attached to the container. When necessary, a means for directing a deploying cushion from the container into the passenger compartment of the automobile is included, generally in the form of a chute that may be integral with the housing. The air bag module is typically covered with a deployment door or doors on the automotive interior side of the module to provide a complete enclosure for the folded cushion and through which the cushion is deployed. The container is normally made of sheet metal with the cushion carried near the opening and the inflator mounted near the back of the container thereby forcing the cushion to deploy through the door when the inflator releases gas during discharge. The air bag module is typically connected to the automobile structure via the reaction container.

An alternate type of air bag module eliminates the container by utilizing the supporting structure of the automobile's instrument panel to house the cushion and inflator. With this type of module the assembly includes an inflator, a skeletal inflator support and the cushion which is positioned atop the inflator and is held in place by a cover. This type of module is attached to the integral instrument panel housing.

The housing is the element of the air bag module to which all of the other module components generally attach. In either of the above described modules the cushion must be connected to the housing in a manner allowing it to receive the discharged gas from the inflator, and when deployed to be spatially positioned in an appropriate location within the automobile's passenger compartment. Several fastening means have been used to hold the cushion in location. A partial list includes: bolts, rivets, rings, clips, rods and hooks. These fasteners are used to attach the perimeter of an opening in the cushion to the perimeter of an opening in the housing. This attachment method allows the gas generated by the inflator to pass through the opening in the cushion. Inflator discharge causes the cushion to unfold and inflate while forcing its way through the cover and to present itself in an inflated state within the passenger compartment of a vehicle.

The cushion is generally fabricated from a material that is suitable for sewn construction and typically includes a sewn hem forming the opening through which gas discharged from the inflator is directed. This opening forms a gas inlet or throat of the inflatable cushion. The hem may be sewn to engage a ring or a rod for fastening to the housing or the cushion may be connected directly to the housing with fasteners such as bolts, rivets or similar devices.

The inflator generates the gas used to deploy and inflate the cushion. The inflator is a weighty device. The effort needed to manipulate the module is increased after it is included in the assembly. Therefore, it is preferable to assemble the remaining components of the air bag module and add the inflator in a final operation of the assembly or possibly at a later time prior to installation in the automobile. In either case the remaining module components must be designed to attach together prior to the addition of the inflator.

It is desirable to reduce the number of fasteners used between the cushion and the housing. It is also desirable to more directly fasten the cushion to the inflator. Such a simplified construction can facilitate assembly of the module. However, as noted above the inflator may be the last component added to the module thereby limiting flexibility in the assembly process, thus complicating a solution to the present problem.

SUMMARY OF THE INVENTION

In accordance with the present invention, an air bag module with the cushion connected to the inflator by a retainer is provided. The object is to avoid the use of rods, brackets, rings, bolts, rivets and the like, that have heretofore been used to connect the cushion to the housing. This invention therefore simplifies the assembly of an air bag module by securing the throat of the cushion more directly to the inflator, the device that is the source of the gas that passes through the throat to inflate the cushion during deployment. The means of engagement is compatible with various assembly techniques including those in which the inflator is added after the cushion.

A preferred embodiment of the invention includes an inflator, a folded cushion, a retainer connecting the cushion to the inflator and a housing that engages the inflator. The housing serves as a container and a reaction device and may take a variety of forms. In general however the housing has a front opening through which the cushion and retainer are inserted during assembly and the cushion can pass when inflated by gas discharged from the inflator during deployment. The front opening is generally covered by a deployment door. The housing additionally has a side or back opening through which the inflator is inserted. The inflator when assembled into the module is positioned near the back of the housing engaging legs of the retainer and extends through the side or back opening of the housing thereby securing the cushion in relation to the housing. As thus assembled the component parts of the assembly form a modular unit.

The retainer is the device that eliminates the use of a multiplicity of fasteners between the cushion and the housing, while providing the flexibility of adding the inflator in a final operation of the module's assembly. In a preferred embodiment the retainer is fabricated from a tubular portion forming a frame in a rectangular configuration with extending legs. The legs are formed from separate stock material that can be rigid or flexible. These extending legs are formed from a continuous strip of material draped around the frame portion and looped around the inflator, providing a means of engagement between the inflator and the retainer frame. Alternately, the legs are formed from a strip of material that loops around the inflator and attaches to each side of the preferred rectangular tubular frame.

In another preferred form the retainer is fabricated from a single piece of sheet metal. After stamping of a metal substrate, the retainer is formed by bending the metal into a frame with extending legs and welding or otherwise securing abutting ends of the member forming the frame. The frame is situated near the inside lip of the housing, around the perimeter of the front opening when assembled. The legs extend within the housing from the frame to near the back of the housing and engage the inflator. The frame of the retainer in a preferred form approximates a rectangle. The legs extend from the frame near two opposing sides, preferably those sides forming the ends of the preferred rectangular frame.

The shape of the frame is designed to follow the interior contour of the housing and is therefore determined according to the housing's configuration in a given application. The preferred embodiments can be fabricated from metal, a molded polymeric material, or otherwise formed from a structurally sufficient material to connect the cushion to the inflator. The important aspect is the elimination of fasteners by connecting the cushion to the inflator with a single retainer rather than to the housing with a plurality of fasteners.

In the preferred embodiment the side opening of the housing has a neck portion to stabilize the mating connection to the inflator. The inflator preferably extends substantially across the back of the housing with the leading end secured to the side of the housing opposite the side opening, thereby securely containing the inflator in the back of the housing. In this preferred form the legs of the retainer extending from the frame on the side opening end of the housing are offset to the interior of the housing thereby avoiding the neck of the side opening. By offsetting one leg in this manner a mechanism is established by which the retainer, and therefore the cushion, can be installed into the housing in only one direction, providing the added benefit of assured proper assembly.

The housing preferably includes a plurality of tabs to temporarily hold the retainer within the housing prior to insertion of the inflator, but which are not designed to permanently secure the retainer within the housing. These tabs preserve the modular form of the assembly during handling and storage, prior to insertion of the inflator. The frame of the retainer may include means to engage the tabs or the tabs may directly engage the body of the frame. Alternatively, a means for temporarily holding the retainer in the housing may be provided as part of the retainer.

The preferred embodiments of the invention are characterized by the flexibility of materials and constructions that are possible with the overriding concept of the invention being connecting the cushion to a retainer that is held within the housing by the inflator. By connecting the cushion to the inflator in this manner the use of a plurality of fasteners between the cushion and housing is avoided. There is a resulting simplification in assembling the module and an elimination of the need to connect several small rivets, bolts or similar devices by providing a retainer that snaps into place.

The above and other objects, features and advantages of the invention will become apparent from the following description, illustration and the presently preferred embodiments thereof.

DETAILED DESCRIPTION OF PREFERRED EMBODIMENTS

Figure 1:
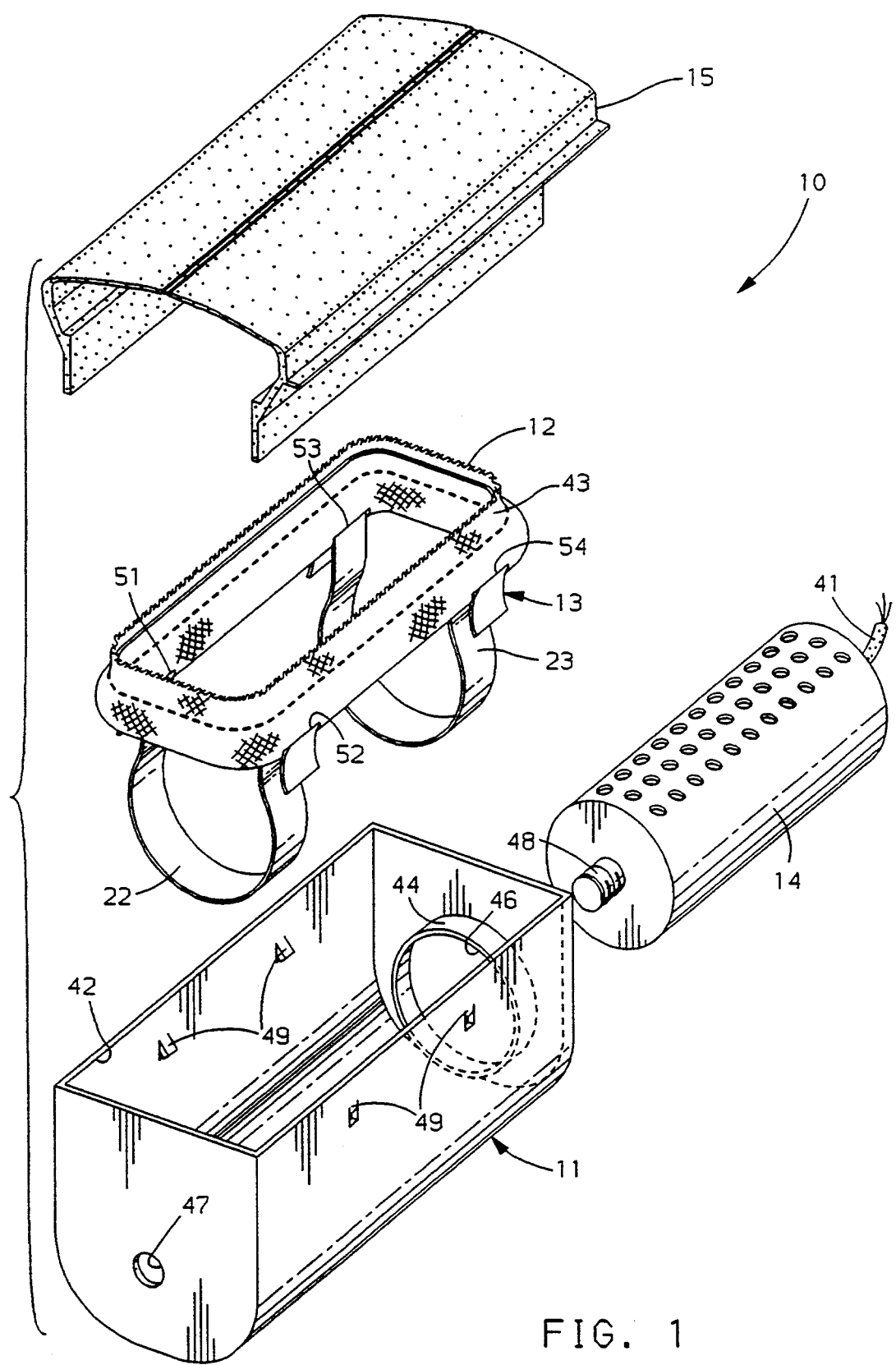
FIG. 1 is an exploded perspective view of an air bag module according to one embodiment of this invention.

As outlined in the above summary the present invention relates to an air bag module with a retaining device for connecting an air bag cushion to an inflator. Depicted in FIG. 1 are the basic component parts of an air bag module 10 including an inflatable cushion 12, partially shown, a retainer 13 for retaining the cushion 12, an inflator 14 for inflating the cushion 12 and holding retainer 13 captive and a housing 11 for containing the inflator 14 and the cushion 12. The housing 11 additionally serves as a reaction device during deployment of the cushion 12 when the inflator 14 discharges. Also shown is a cover 15 that serves as a deployment door.

Figure 2:
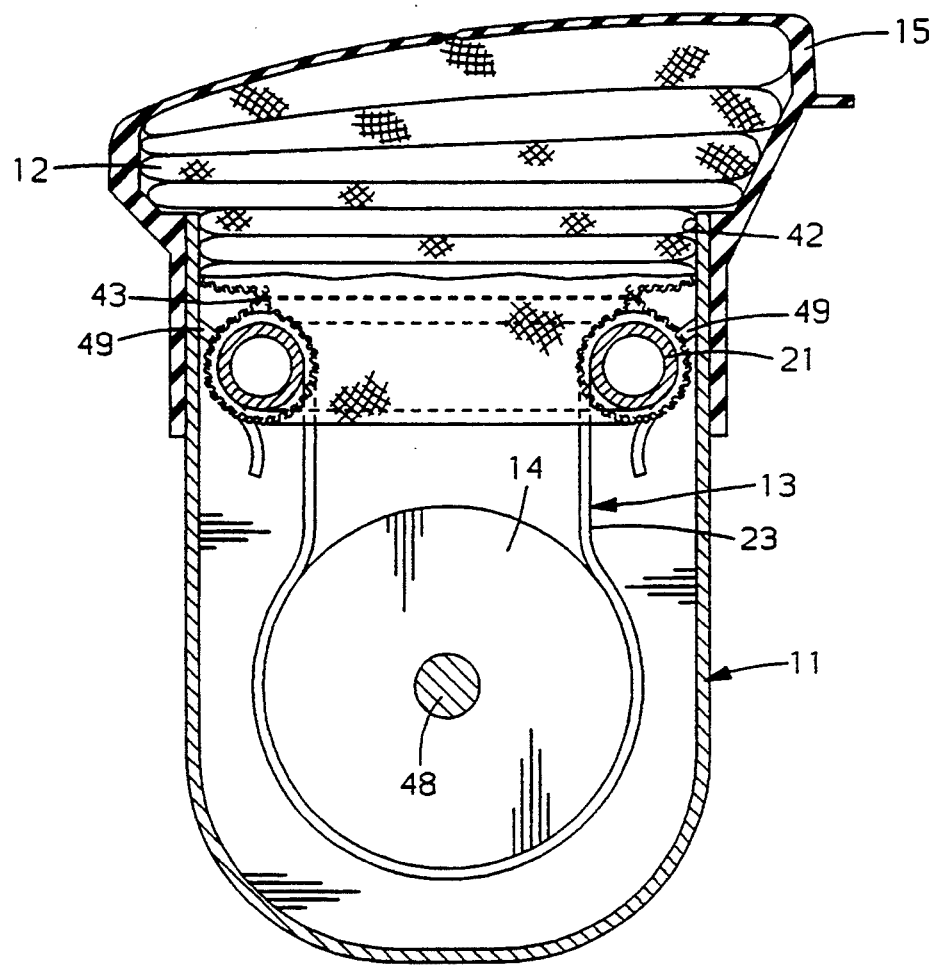
FIG. 2 is an sectional view of the assembly of FIG. 1.

FIG. 2 shows an assembled sectional view of the aforementioned basic module components. Referring to FIG. 1 and FIG. 2 together, the inflator 14 includes means 41 for coupling to sensing and control systems that actuate the release of gas from the inflator 14. The gas release forces the cushion 12 to deploy, opening the door 15 and then to exit through the housing's front opening 42. The retainer 13 according to the present invention functions to secure the throat 43 of the cushion 12 to the inflator 14 by means of the extending legs 22 and 23 that engage the inflator 14. The housing 11 acts as a reaction device transferring forces to the automobile's structure and causing the released gas from the inflator 14 to force the cushion 12 away from the interior surface of the housing 11 thereby deploying the cushion 12 through the opening 42, presenting it in an inflated state within the passenger compartment of an automobile.

FIG. 1 illustrates additional features of the preferred embodiment of the present invention. Tabs 49 are presented to engage the retainer 13 and hold it within the housing 11 during handling prior to the insertion of the inflator 14. This use of the retainer 13 is limited in a temporal sense and is provided because the assembly of the module 10 may be in stages, with the cushion 12 and retainer 13 assembled in the housing 11 at a time prior to and remote from the insertion of the inflator 14. Temporary retaining means may alternatively or conjunctively be provided on the retainer 13 to engage the housing 11 for this purpose in a similar manner.

The opening 46, as illustrated with neck portion 44, receives the inflator 14. When the inflator 14 is inserted into the housing 11 it preferably extends across the back of the housing and post 48 protrudes through opening 47. The extension of inflator 14 through openings 46 and 47 provides the means whereby the legs 22 and 23 of the retainer 13 are secured toward the back of the housing 11 and therefore the connected retainer frame 21 secures the throat 43 of the cushion 12 adjacent to the lip of the opening 42 of the housing 11. In the preferred embodiment the inflator 14 is inserted through the side opening 46. Alternatively, an opening in the back of housing 11, rather than the side, could be provided for the insertion of inflator 14.

Also shown in FIG. 1 are collars 51–54, provided in the hem of the cushion around the junction between the legs 22 and 23 and the frame 21. The cushion 12 may be sewn onto the retainer frame 21 before or after the legs 22 an 23 are attached. Another method of assembly is to sew a loop around the throat 43 of cushion 12 and then position the ends of legs 22 and 23 in the collars of the cushion. The frame 21 is provided in mating sections, connected at joints 26 and 27 as shown in FIG. 3, that are inserted through the sewn loop in the cushion engaging the legs 22 and 23 at the collars 51–54.

Figure 3:
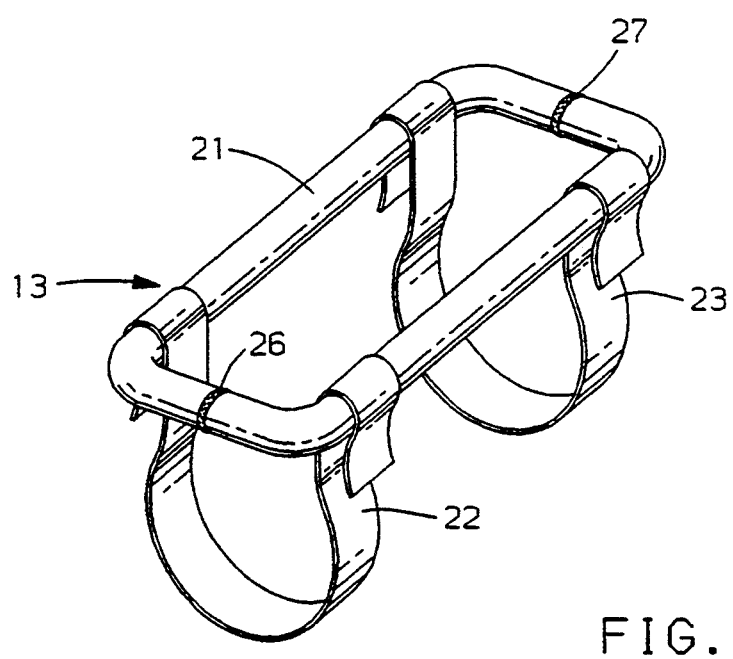
FIG. 3 is a perspective view of an embodiment of the retainer of FIG. 1.

The retaining device 13 of the present invention as described in the presently preferred embodiment illustrated in FIG. 1 is shown for a more complete description in FIG. 3. FIG. 3 illustrates an embodiment that is comprised of a round tubular frame 21 of a generally planar, rectangular configuration. The general shape of the frame 21 is dictated by the shape of the housing in a given application and will therefore vary. Frame 21 is formed by providing a length of tubing and bending four angles therein to generate the preferred rectangular shape. The ends of the tubing about one another and are attached preferably by welding. Alternatively, a plurality of tubing segments can be used to construct the rectangular frame. The area within the frame's perimeter is free of obstructions allowing the cushion 12 to deploy freely from the housing 11.

Legs 22 and 23 extend from the frame. The legs are formed as independent members and are connected to the frame 21 by passing them over the front of the side members of the rectangular frame 21 and extending each end of the strap back adjacent to the legs of the strap, forming end loops around the retainer frame. The legs 22 and 23 are formed providing a semi-circular segment between the end loops to follow the exterior surface contour of a preferred cylindrical inflator 14. An engagement mechanism is thereby established between the retainer frame 21 and inflator 14.

The embodiment in FIG. 3 simplifies the operation of sewing the cushion to the frame of the retainer by allowing the addition of the legs subsequent to sewing. Alternatively the legs may be connected to the frame prior to the sewing operation. In yet another variation the cushion may be sewn with a loop formed around the throat for later insertion of a frame that is provided in segmented form. In this alternative the segments slide into the loop and through the openings in the straps at collars 51–54, as shown in FIG. 1, around the hem provided for the straps. The ends of the frame segments are then joined at 26 and 27 to form the frame 21.

Figure 4:
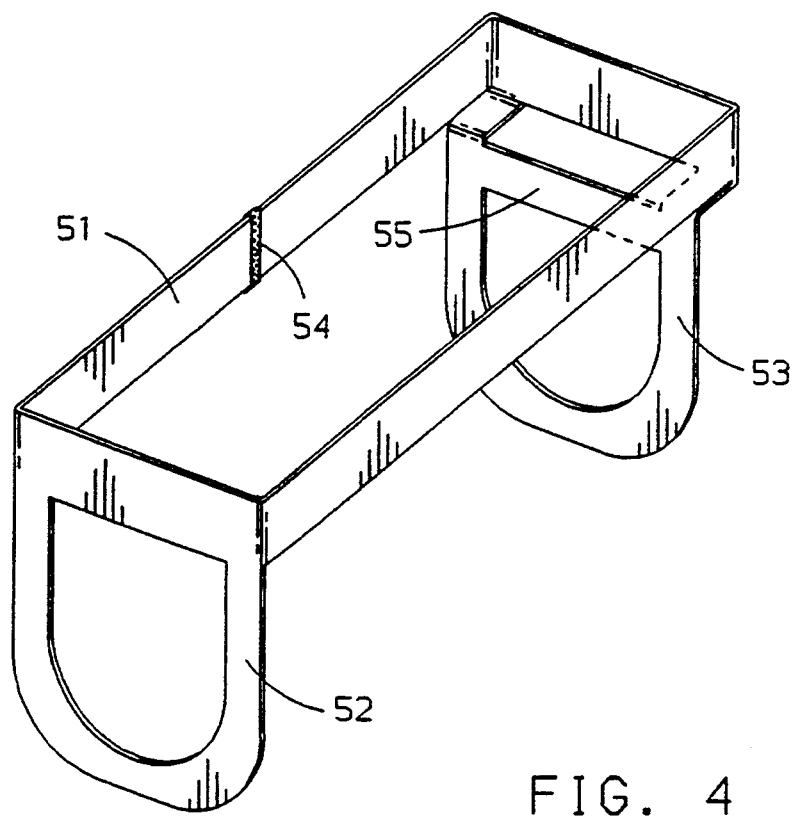
FIG. 4 is a perspective view of another embodiment of the retainer according to the present invention.

FIG. 4 illustrates an alternative embodiment of the invention. The construction of this embodiment in a preferred metal composition starts with a flat piece of stock material that is stamped to provide a single planar part. The part is then bent to form the retainer as illustrated in FIG. 3. The frame 51 is rectangular to complement the preferred rectangular shape of the housing section near the front opening. Frame element 51 has a solid rectangular cross section with a large dimension parallel to the route of cushion deployment. Rigidity in this direction is required for the retainer to properly maintain the throat of the cushion in a position adjacent to the front opening of the housing. Due to the fabrication of the retainer in the previously mentioned manner the frame 51 will have a seam 54 across its perimeter. This seam is preferably welded to form a continuous frame portion 51, or otherwise securely fastened together.

As shown in FIG. 4, legs 52 and 53 of the retainer are formed generally in a U-shaped configuration to engage the cylindrical inflator 14. In this embodiment the legs are included as part of the one-piece arrangement of the retainer and extend from the ends of the rectangular frame. In the preferred embodiment with a neck 44, as shown in FIG. 1, protruding from the side opening of the housing, leg 53 is offset from the end of frame 51 so that the retainer may be inserted into the housing in only one direction with the leg 53 avoiding the neck 44. This feature is also applicable to the other alternative embodiments of the invention in a similar manner. Leg 53 exhibits a cross member 55 for increased rigidity at the point of offset. The structural configuration shown in this preferred embodiment may also be adequately formed from a polymer or other structurally sufficient material other than sheet metal to form the retainer according to the present invention.

Figure 5:
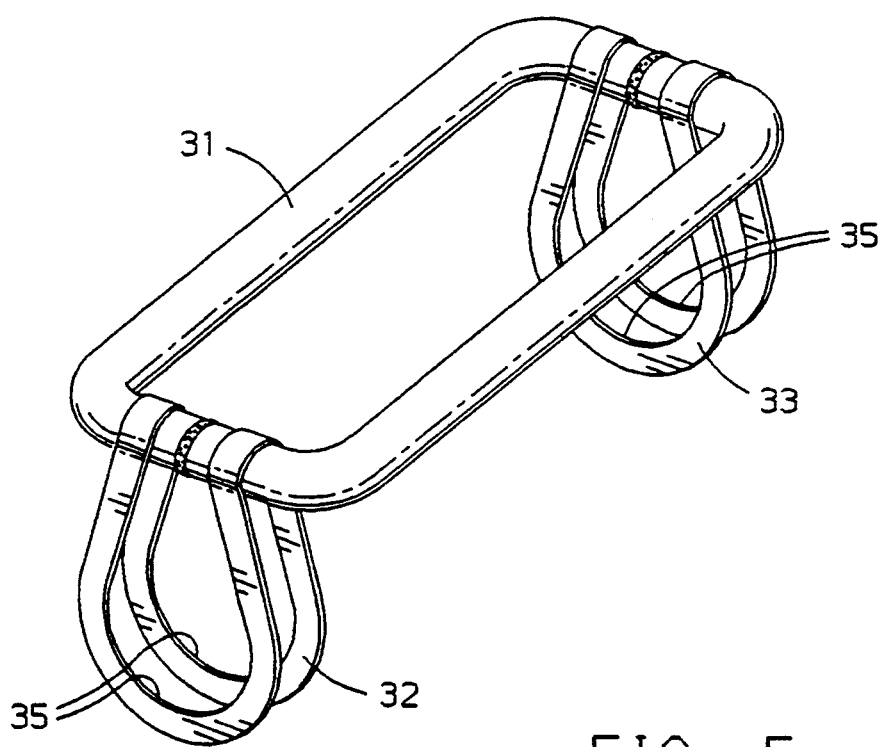
FIG. 5 is a perspective view of another embodiment of the retainer of the present invention.

FIG. 5 shows another embodiment of the present invention. The frame 31 can be comprised of a variety of materials, in the preferred embodiment the material is tubular steel. The cross section of the tube can also take a variety of shapes. In preferred form the tubing is round. Frame 31 is formed into the preferred rectangular shape. Legs 32 and 33 in this embodiment are formed as a one piece element shaped similarly to two horse shoes attached at the heel ends. The leg elements are draped around the ends of the rectangular shaped frame 31 each extending perpendicular to the same side of frame 31 forming U-shaped openings 35. Legs 32 and 33 thereby exhibit the openings 35 through which the inflator of the present invention is inserted to engage the retainer and retain the cushion. The legs may be made from a flat stock material or from a rod or wire material.

Figure 6:
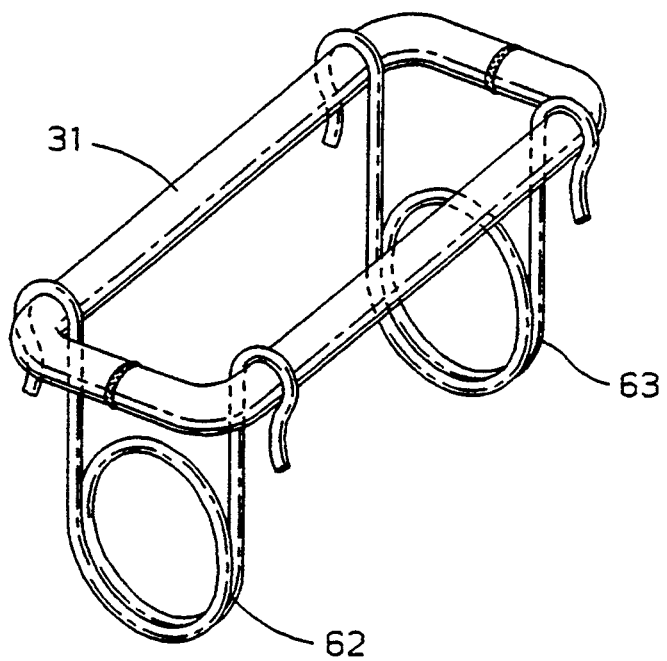
FIG. 6 is a perspective view of another embodiment of the retainer of the present invention.
Figure 7:
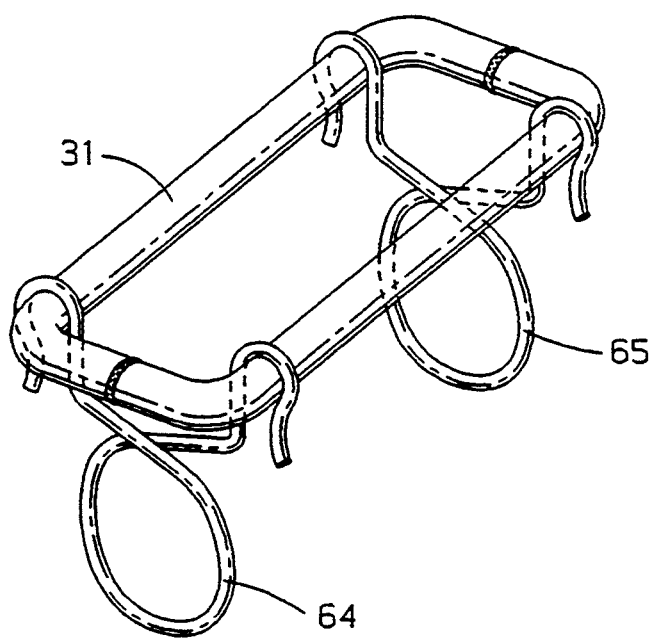
FIG. 7 is a perspective view of another embodiment of the retainer of the present invention.

FIGS. 6 and 7 provide illustrations of additional embodiments of the present invention. Legs 62–65 are formed from rod or wire element, preferably of a steel composition. The element is looped so that the legs exhibit generally circular openings through which a cylindrical-shaped inflator is positioned. Each leg is formed from a single length of material, providing a means of engagement between the retainer frame and the inflator.

While this invention has been described in terms of preferred embodiments thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An air bag module comprising:
    a housing having a cushion opening and an inflator opening, the housing defining a contained area;
    a retainer including a substantially planar frame positioned adjacent to the housing near the cushion opening and a plurality of legs extending substantially perpendicular to the frame located substantially within the contained area of the housing;

an inflator located substantially within the contained area of the housing, extending through the inflator opening directly engaging the legs of the retainer and the housing to hold the retainer in position relative to the housing; and a cushion attached to the retainer, folded and carried at the cushion opening of the housing.

2. An air bag module comprising:

a housing having a front opening, a side opening and an interior defining a contained area;

an inflator located substantially within the contained area of the housing engaging the housing at the side opening;

a retainer located substantially within the contained area of the housing engaging the inflator including a substantially planar frame positioned adjacent to the housing inside the front opening and a plurality of legs extending perpendicular to the frame within the contained area of the housing, the legs forming a passage having an axis perpendicular to the legs and parallel to the frame, wherein the inflator extends through the passage formed by the legs along the axis engaging the retainer legs;

a cushion attached to the retainer, folded and carried at the front opening of the housing.

3. An air bag module according to claim 2 further comprising means for temporarily holding the retainer within the housing.

4. An air bag module according to claim 3 wherein the means for temporarily holding the retainer within the housing include a plurality of tabs on the housing within the contained area that engage the retainer.

5. An air bag module according to claim 2 wherein one leg extends from the frame adjacent to the side opening of the housing, the side opening including a neck extending into the contained area of the housing, wherein the adjacent leg is offset toward the housing interior thereby avoiding the neck, 6. An air bag module for installation in a vehicle comprising:

a retainer including a substantially planar frame and a plurality of legs extending from the frame, substantially perpendicular to the frame;

an air bag cushion connected to the frame of the retainer;

an inflator engaging the legs of the retainer and secured to the vehicle to capture the retainer; and means for directing the air bag cushion into the vehicle when the inflator discharges.

7. An air bag module according to claim 6 wherein the frame of the retainer is substantially rectangular shaped and the legs of the retainer are substantially U-shaped.

8. A method of assembling an air bag module which includes a housing, a cushion, a cushion retainer including a substantially planar frame with a plurality of legs extending substantially perpendicular to the frame and an inflator comprising the steps of:

a. attaching the cushion to the cushion retainer;
 b. inserting the cushion retainer and cushion into the housing;
 c. inserting the inflator into the housing engaging the legs of the cushion retainer to hold the cushion retainer in position relative to the housing; and
 d. attaching the inflator to the housing.

9. A method of assembling an air bag module which includes a container, a cushion, a cushion retainer including a substantially planar frame with a plurality of legs extending substantially perpendicular to the frame, a cover and an inflator comprising the steps of:

a. attaching the cushion to the cushion retainer;
 b. inserting the cushion retainer and cushion into the container;
 c. attaching the cover to the container;
 d. handling the container including the cushion, cushion retainer and cover;
 e. inserting the inflator into the container engaging the legs of the cushion retainer; and
 f. attaching the inflator to the container.

10. A method of assembling an air bag module which includes a container having a front opening and a side opening, an inflator, a cushion having a throat opening with hem loops and collars and a retainer having frame segments with engagable ends and legs with end loops comprising the steps of:

a. locating the end loops of the retainer legs in the collars of the cushion throat opening;
 b. inserting the frame segments into the hem loops and the end loops of the retainer legs;
 c. connecting the engagable ends of the frame segments;
 d. inserting the retainer and cushion into the container through the front opening;
 e. inserting the inflator into the container through the side opening engaging the legs of the retainer; and
 f. attaching the inflator to the container.

* * * * *